(12) United States Patent
Li et al.

(10) Patent No.: US 11,780,954 B2
(45) Date of Patent: Oct. 10, 2023

(54) MODIFIED POLYETHER POLYOL AND USE THEREOF IN POLYURETHANE FOAM MATERIALS

(71) Applicant: WANHUA CHEMICAL GROUP CO., LTD., Shandong (CN)

(72) Inventors: Fuguo Li, Shandong (CN); Yang Liu, Shandong (CN); Changxun Ju, Shandong (CN); Naihua Jiang, Shandong (CN); Bin Liu, Shandong (CN); Chengqun Qin, Shandong (CN); Lunpeng Wang, Shandong (CN)

(73) Assignee: WANHUA CHEMICAL GROUP CO., LTD., Shandong (CN)

( * ) Notice: Subject to any disclaimer, the term of this patent is extended or adjusted under 35 U.S.C. 154(b) by 106 days.

(21) Appl. No.: 17/288,834

(22) PCT Filed: Dec. 26, 2018

(86) PCT No.: PCT/CN2018/123901
§ 371 (c)(1),
(2) Date: Apr. 26, 2021

(87) PCT Pub. No.: WO2020/132944
PCT Pub. Date: Jul. 2, 2020

(65) Prior Publication Data
US 2021/0355263 A1 Nov. 18, 2021

(51) Int. Cl.
| | | |
|---|---|---|
| C08F 212/08 | (2006.01) |
| C08F 283/06 | (2006.01) |
| C08F 290/06 | (2006.01) |
| C08G 18/16 | (2006.01) |
| C08G 18/18 | (2006.01) |
| C08G 18/22 | (2006.01) |
| C08G 18/32 | (2006.01) |
| C08G 18/40 | (2006.01) |
| C08G 18/48 | (2006.01) |
| C08G 18/63 | (2006.01) |
| C08G 18/66 | (2006.01) |
| C08G 18/76 | (2006.01) |
| C08G 65/332 | (2006.01) |
| C08J 9/12 | (2006.01) |

(52) U.S. Cl.
CPC .......... *C08G 18/632* (2013.01); *C08F 283/06* (2013.01); *C08G 18/3275* (2013.01); *C08G 18/4072* (2013.01); *C08G 18/485* (2013.01); *C08G 18/636* (2013.01); *C08G 18/6688* (2013.01); *C08G 18/7671* (2013.01); *C08J 9/125* (2013.01); *C08G 2110/0083* (2021.01); *C08J 2203/10* (2013.01); *C08J 2375/12* (2013.01)

(58) Field of Classification Search
CPC ..... C08G 18/63; C08G 18/632; C08G 18/636
See application file for complete search history.

(56) References Cited

U.S. PATENT DOCUMENTS

| | | | |
|---|---|---|---|
| 3,960,935 A | 6/1976 | Samour | |
| 4,390,645 A | 6/1983 | Hoffman et al. | |
| 4,550,194 A | 10/1985 | Reichel et al. | |
| 4,998,857 A | 3/1991 | Paravella et al. | |
| 5,268,418 A * | 12/1993 | Simroth | C08G 18/635 524/769 |
| 5,364,906 A | 11/1994 | Critchfield et al. | |
| 6,403,667 B1 | 6/2002 | Eleveld et al. | |
| 2006/0025558 A1 | 2/2006 | Adkins et al. | |
| 2018/0072846 A1 | 3/2018 | Adkins et al. | |
| 2022/0017682 A1 * | 1/2022 | Li | C08G 18/632 |
| 2022/0356296 A1 * | 11/2022 | Adkins | C08G 18/14 |

FOREIGN PATENT DOCUMENTS

| | | |
|---|---|---|
| CN | 1354764 A | 6/2002 |
| CN | 1733813 A | 2/2006 |
| CN | 101311203 A | 11/2008 |
| CN | 101657485 A | 2/2010 |
| CN | 103068867 A | 4/2013 |
| CN | 108623757 A | 10/2018 |
| EP | 2253584 A1 | 11/2010 |
| GB | 1418884 A | 12/1975 |
| JP | S59161406 A | 9/1984 |
| WO | 9940144 A1 | 8/1999 |

OTHER PUBLICATIONS

Indian Office Action dated Sep. 24, 2021 in corresponding patent application No. 202127020459.
Chinese Office Action dated Feb. 23, 2021 in corresponding patent application No. 201811602982.6.

(Continued)

*Primary Examiner* — Melissa A Rioja
(74) *Attorney, Agent, or Firm* — Norton Rose Fulbright US LLP; James R. Crawford

(57) ABSTRACT

Provided are a modified polyether polyol and the use thereof in polyurethane foam materials. The method for preparing a modified polyether polyol comprises the following steps: 1) reacting a compound A with a polyether polyol, wherein the compound A is an anhydride and/or dicarboxylic acid compound containing a polymerizable double bond, preferably selected from one or two of maleic anhydride and itaconic anhydride, preferably maleic anhydride; and 2) reacting the product obtained in step 1) with an epoxy compound containing a polymerizable double bond in the presence of a catalyst, in order to prepare the modified polyether polyol. The modified polyether polyol obtained by means of the preparation method has more active sites, uses the polymerizable double bond for blocking, is used as a dispersion stabilizer for the synthesis of copolymer polyols, and has the characteristics of a better dispersion stability, filterability and a low viscosity.

16 Claims, 3 Drawing Sheets

(56) References Cited

OTHER PUBLICATIONS

Supplemental European Search Report dated Jun. 15, 2022 in corresponding patent application No. 18944686.7-1107.
International Search Report issued in PCT/CN2018/123901 dated Sep. 30, 2019.

* cited by examiner

MODIFIED POLYETHER POLYOL AND USE THEREOF IN POLYURETHANE FOAM MATERIALS

This application is a national phase under 35 U.S.C. § 371 of International Application No. PCT/CN2018/123901 filed on Dec. 26, 2018, which is hereby incorporated by reference in its entirety.

TECHNICAL FIELD

The present disclosure relates to a synthesis of a modified polyether polyol and the use thereof and, in particular, to a synthesis of a modified polyether polyol with multiple active sites and the use thereof as a dispersion stabilizer in a synthesis of a copolymer polyol.

BACKGROUND

Polyurethane foam is prepared by reacting a polyisocyanate with a polyol in the presence of a foaming agent. Various modified polyol products have been developed by those skilled in the art in order to improve a bearing property and other properties. Common types are dispersions of polymer particles in polyols, such as vinyl polymer particle polyols (styrene-acrylonitrile dispersions), polyurea particle dispersions (PHD polyols), and polyisocyanate addition polymers (PIPA polyols and polyurethane-polyurea particle dispersions). Currently, the dispersions of styrene/acrylonitrile copolymers in polyols (simply referred to as copolymer polyols or polyol polymer dispersions) are widely commercialized. Their stability is mostly achieved by the stabilizing effect of grafting or addition products formed between the polymers of unsaturated compounds and polyol molecules. There are numerous methods known in the art. In addition to the unsaturation inherent to polyoxyalkylene polyols for forming dispersions, these methods generally introduce a small amount of unsaturation into the polyols. A typical molecular design is shown in FIG. 1, with one active site such as a polymerizable unsaturated double bond attached to an end of the multi-branched polyether.

As described in previously published patent documents such as U.S. Pat. Nos. 4,550,194 and 4,998,857, a polyether polyol starting from sorbitol or pentaerythritol is reacted with maleic anhydride in the presence of a catalyst to perform a ring-opening reaction, followed by a reaction with alkylene oxide such as ethylene oxide or propylene oxide. Unsaturation is introduced by maleic anhydride. The process is concise, the reaction is complete, and the device is low in cost. However, a polymeric polyol synthesized with a stabilizer prepared with maleic anhydride has high viscosity. EP02253584 has disclosed a stabilizer prepared by reacting phthalic anhydride with glycidyl methacrylate in the presence of a catalyst. The synthesis takes a long time and uses an organotin catalyst which remains in the copolymer polyol and affects a subsequent reaction of a hydroxyl compound with an isocyanate, causing a foam product to fall back, irregular foam pores, and pore collapse in an extreme formulation.

SUMMARY

In view of this, the present disclosure provides a method for preparing a modified polyether polyol. The modified polyether polyol prepared by the method has more active sites, and has the characteristics of good dispersion stability, good filterability and low viscosity when served as a dispersion stabilizer in synthesis of a copolymer polyol.

To achieve the preceding object, the present disclosure adopts technical solutions described below.

One aspect of the present disclosure provides a method for preparing a modified polyether polyol, comprising the following steps:

(1) contacting and reacting a compound A with a polyether polyol to perform an esterification ring-opening or an esterification reaction, preferably at a reaction temperature of 80-160° C., more preferably 120-140° C.; wherein the compound A is an anhydride and/or a dicarboxylic acid compound containing a polymerizable double bond, preferably one or two selected from maleic anhydride and itaconic anhydride, preferably maleic anhydride; and (2) reacting the product obtained in step (1) with an epoxy compound containing a polymerizable double bond in the presence of a catalyst to perform ring-opening addition, preferably at a reaction temperature of 60-150° C., more preferably 80-130° C., to produce the modified polyether polyol.

In some preferred embodiments, a molar ratio of the compound A to the polyether polyol is 0.5-1.5:1, preferably 0.9-1:1; and a molar ratio of the compound A to the epoxy compound is 0.2-4:1, preferably 0.5-1.5:1.

In some preferred embodiments, in step (1), the reaction temperature is 80-160° C., preferably 120-140° C.; and in step (2), the reaction temperature is 60-150° C., preferably 80-130° C.

In some preferred embodiments, in step (1), the compound A may be reacted with the polyether polyol in the presence or absence of a catalyst. Preferably, the reaction is performed in the presence of a catalyst, where the catalyst is used in an amount of preferably 0.1% to 3%, for example 0.1% of the mass of the polyether polyol.

In a case where the reaction in step (1) is performed in the presence of a catalyst, the catalyst used may be one or a combination of two or more of carbonates, bicarbonates, and hydroxides of alkali metals or alkaline earth metals, preferably one or a combination of two or more of hydroxides of alkali metals, for example, but not limited to, one or more of sodium hydroxide, potassium hydroxide, and the like. The hydroxides of alkali metals may be used alone or in solution, where a solvent is preferably one or a combination of two or more of water, alcohols, ethers, amines, and ammonia, and is more preferably used in the form of an aqueous solution.

In some preferred embodiments, the epoxy compound containing a polymerizable double bond is any 1,2-epoxide containing an olefinic double bond, for example, one or a combination of two or more selected from glycidyl methacrylate, glycidyl acrylate, and derivatives thereof, preferably one or a combination of two or more of allyl glycidyl ether, glycidyl methacrylate, and glycidyl acrylate, more preferably glycidyl methacrylate.

The catalyst used in step (2) preferably adopts a composite catalyst comprising a catalyst A and a catalyst B, wherein the catalyst A is an oxidized tertiary amine compound, for example, one or a combination of two or more of oxidized aryl tertiary amines, oxidized alkyl tertiary amines, oxidized cycloalkyl tertiary amines, oxidized acyl tertiary amines, and oxidized hydroxyl-substituted tertiary amines. Wherein, the oxidized aryl tertiary amines are, for example, oxidized dimethylanilines; the oxidized alkyl tertiary amines are, for example, one or a combination of two or more selected from oxidized dimethyl benzyl tertiary amines, oxidized dimethyl decyl tertiary amines, oxidized dimethyl dodecyl tertiary amines, oxidized dimethyl octyl tertiary amines, and oxidized dimethyl nonyl tertiary amines; and the oxidized hydroxyl-substituted tertiary amines are, for example, one or more selected from oxidized dihydroxymethylbutylamines and oxidized dihydroxyethyldodecyltertiary amines. Preferably, the catalyst A is selected from oxidized alkyl methyl tertiary amines containing 8-22 carbon atoms, for example, but not limited to, one or a combination of two or more of oxidized dimethyl octyl tertiary amines, oxidized dimethyl nonyl tertiary amines, oxidized dimethyl decyl tertiary amines, and oxidized dimethyl dodecyl tertiary amines. The catalyst A may be involved in the reaction in the form of a solution or in a pure form, and preferably be added in a pure form from the perspective of the reaction. Commercially available oxidized tertiary amines are mostly in the form of aqueous solutions and preferably used after water is removed.

The catalyst B is a halide; preferably one or a combination of two or more of an organic bromide, a bromide salt, an iodide salt, and an organic iodide; further preferably one or a combination of two or more of divalent or trivalent metal bromide salts and divalent or trivalent metal iodide salts which are, for example, but not limited to, one or a combination of two or more of calcium bromide, zinc bromide, barium bromide, and cuprous iodide; preferably one or a combination of two or more of calcium salts and barium salts, for example, calcium bromide and/or barium bromide, etc.

In some preferred embodiments, in the catalyst used in step (2), the mass ratio of the catalyst A to the catalyst B is 0.5-4:1, preferably 1.5-2.5:1.

In some embodiments, a total amount of the catalyst used in step (2) is 0.01% to 3%, preferably 0.1% to 0.5% of the mass of the polyether polyol in step (1).

During preparation of modified polyether polyols according to the present disclosure, the specific type of the used raw material i.e. polyether polyol is not particularly limited. In some preferred embodiments, the polyether polyol used in step (1) has an average molecular weight of 2500-15000, preferably 5000-14000; and an average functionality of at least 2.0, preferably 2.5-6.0. The polyether polyol (also generally referred to as a polyoxyalkylene polyol) is obtained by reacting a starter compound having an active hydrogen atom with one or more epoxy compounds, wherein the epoxy compound(s) is(are), for example, one or more of ethylene oxide, propylene oxide, and butylene oxide.

During preparation of modified polyether polyols according to the present disclosure, step (1) or step (2) may be performed in the presence or absence of a solvent. When performed in a solvent system, the solvent is preferably a proton-free polar solvent and preferably a solvent capable of dissolving an tricarboxylic acid and subsequent epoxy compounds, for example, one or a combination of two or more of acetone, tetrahydrofuran, methyl ethyl ketone, and the like.

During preparation of modified polyether polyols according to the present disclosure, an polymerization inhibitor may be optionally added (may be or may not be added) in step (2) that is the reaction for preparing the modified polyether. The polymerization inhibitor is, for example, but not limited to, one or a combination of two or more of hydroquinone, p-t-butylcatechol, p-hydroxyanisole, methylhydroquinone, phenothiazine, and diphenylamine. The amount of the polymerization inhibitor is, for example, 0% to 1.5% of the total mass of reductants in step (2), preferably 30-2000 ppm.

During preparation of modified polyether polyols according to the present disclosure, the compound A in step (1) is preferably maleic anhydride which may be added as a solid or in the form of a solution. The compound A may be in various forms, such as granules, powder, tablets, or the like. As an implementable solution, the compound A is preferably added in the form of tablets or granules. In step (1), the molar ratio of maleic anhydride to the polyether polyol is preferably 0.5-1.5:1, more preferably 0.9-1:1; and maleic anhydride is reacted with the polyether polyol at a reaction temperature of preferably 80-160° C., more preferably 120-140° C.

During preparation of modified polyether polyols according to the present disclosure, the reaction in step (1) may be carried out under normal, negative, or positive pressure, preferably under normal pressure for convenience of operation.

For ease of understanding, the following illustrates a schematic diagram of the reaction for preparing the modified polyether polyol in an embodiment. In this example, maleic anhydride is reacted with the polyether polyol, and the resulting product is reacted with the epoxy compound containing a polymerizable double bond (glycidyl methacrylate (GMA)). The product i.e. modified polyether polyol obtained in this example has two active sites in series (which are specifically polymerizable unsaturated double bonds in this example). The structure diagram thereof is shown in FIG. 2. It is to be noted that this is merely an example and should not be construed as limiting the present disclosure.

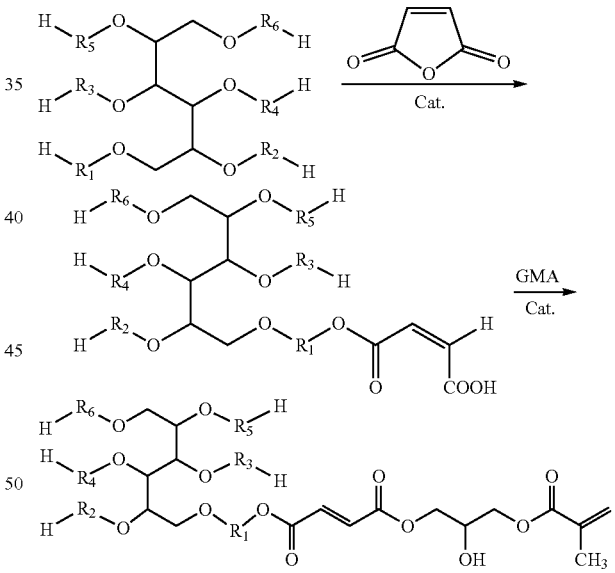

wherein

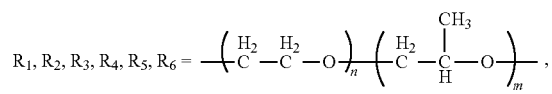

wherein m and n are both integers greater than or equal to 0, preferably, n=19-127 and m=14-96.

Another aspect of the present disclosure provides a modified polyether polyol, which is prepared by the preparation method described above.

The modified polyether polyol provided in another aspect of the present disclosure has the following structural characteristics: the modified polyether polyol includes a polyether segment, an active group A, and an active group B, wherein the active group A is linked to the polyether segment by an ester group, the active group B is linked to the active group A by a linking group which is an organic segment with a molecular weight of less than 200; and the active group A and the active group B are each independently an alkenyl group containing a polymerizable unsaturated double bond, such as a vinyl group, a propenyl group, or the like;

preferably, the linking group is one or a combination of two or more selected from an ester group, an ether group, an alkyl group, an amide group, and a thioether group, preferably the linking group contains at least one of a sulfhydryl group and/or a hydroxyl group; further preferably, the linking group contains an ester group and a hydroxyalkyl group, for example, the linking group is formed by linking these two groups;

In some embodiments, the modified polyether polyol has the following structural formula (I):

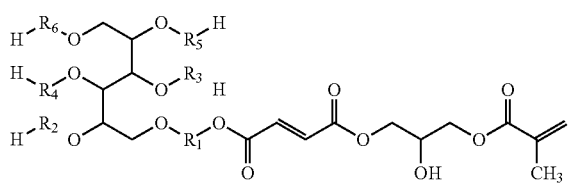

wherein,

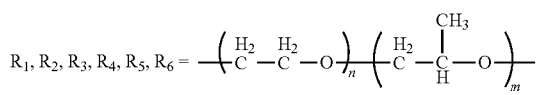

and m and n are both integers greater than or equal to 0, preferably, n=19-127 and m=14-96.

Preferably, the modified polyether polyol is prepared by the preparation method described above.

The modified polyether polyol prepared in the present disclosure is particularly suitable for being used as a dispersion stabilizer for preparing a copolymer polyol. Therefore, the present disclosure further provides a method for preparing a copolymer polyol, comprising: polymerizing a base polyether polyol with at least one olefinic unsaturated monomer in the presence of an initiator and a dispersion stabilizer to obtain the copolymer polyol; wherein the dispersion stabilizer is the modified polyether polyol described above.

The specific type of the base polyether polyol used for preparing the copolymer polyol is not particularly limited and may be determined by those skilled in the art according to the final use of the copolymer polyol. For example, if the copolymer polyol is used for the production of flexible polyurethane foam bulks, a polyether polyol for general flexible polyurethane foam, which is generally a trifunctional base polyether polyol having a hydroxyl value of 54-58 mgKOH/g, is selected; if the copolymer polyol is used for the production of high-resilience foam, a polyether polyol for high-resilience foam, which is generally a trifunctional base polyether polyol having high activity and a hydroxyl value of 33.5-36.5 mgKOH/g, is selected. The base polyether polyol in the present disclosure is preferably a trifunctional polyether polyol having a hydroxyl value of 54-58 mgKOH/g.

During preparation of copolymer polyols according to the present disclosure, the used olefinic unsaturated monomer is not particularly limited. For example, vinyl monomers suitable for preparing copolymer polyols and accepted in the art may be used, which include, but are not limited to, one or more of aliphatic conjugated dienes, vinyl aromatic compounds, α,β-olefinic unsaturated nitriles, α,β-olefinic unsaturated nitrile amides, α,β-olefinic unsaturated carboxylic acids, α,β-olefinic unsaturated carboxylates, vinyl esters, vinyl ethers, vinyl ketones, vinyl halides, and vinylidene halides. In some preferred embodiments, the olefinic unsaturated monomer is preferably selected from, but not limited to, a combination of a vinyl aromatic compound and an olefinic unsaturated nitrile, more preferably a combination of styrene and acrylonitrile with a mass ratio of preferably 10:90 to 90:10, more preferably 60:40 to 90:10. Preferably, the mass ratio of the olefinic unsaturated monomer to the base polyether polyol is 0.1% to 200%, preferably 30% to 140%.

During preparation of copolymer polyols, preferably, the dispersion stabilizer occupies 0.3% to 10%, preferably 2% to 5% of the total mass of the base polyether polyol and the olefinic unsaturated monomer.

During preparation of copolymer polyols, the polymerization of the olefinic unsaturated monomer is performed in the presence of the initiator. Preferably, the amount of the initiator is 0.01 wt % to 5 wt % of the total mass of the base polyether polyol and the olefinic unsaturated monomer. The initiator commonly used in the art may be used, for example, one or a combination of two or more of peroxides and azo compounds. The peroxide is, for example, one or a combination of two or more selected from dibenzoyl peroxide, lauroyl peroxide, t-butyl hydroperoxide, benzoyl peroxide, and di-t-butyl peroxide. The azo compound is, for example, one or a combination of two or more selected from azobisisobutyronitrile (AIBN), azoisovaleronitrile (AMBN), and dimethyl azobisisobutyrate (V601).

Specific process operations for preparing the copolymer polyol may be carried out according to existing processes in the art and are not particularly limited here. In some embodiments, during preparation of copolymer polyols, the reaction temperature may be 80-140° C., preferably 90-120° C.; and the reaction pressure (gauge pressure) may be 0-0.6 Mpa, preferably 0.05-0.4 MPa.

In some preferred embodiments, during preparation of copolymer polyols, the polymerization of the olefinic unsaturated monomer is preferably performed in the presence of a chain-transfer agent. The amount of the chain-transfer agent is preferably 0.1 wt % to 6 wt %, preferably 0.2 wt % to 5 wt % of the total mass of the base polyether polyol and the olefinic unsaturated monomer. The chain-transfer agent is, for example, one or a combination of two or more selected from 1-butanol, 2-butanol, isopropanol, ethanol, methanol, water, cyclohexane, and a thiol. The thiol is, for example, one or a combination of two or more of dodecanethiol, ethanethiol, 1-heptanethiol, 2-octanethiol, and toluenethiol.

In some embodiments, other compounds may also be used in the process of preparing the copolymer polyol, such as compounds that promote the mixing of components, compounds that reduce viscosity, and/or compounds that can enable one or more of the components used to be better dissolved in a reaction medium. The compounds that reduce the viscosity to promote the mixing of components is, for example, toluene, dichloromethane, or the like.

In the present disclosure, the copolymer polyol may be prepared through batch or continual operations. A specific preparation process of the copolymer polyol may adopt the existing process in the art. In some embodiments, after the copolymer polyol is prepared, the method further includes a process of removing unreacted monomers and the chain-transfer agent, which may be performed by common removal means in the art such as distillation, flash distillation, scraper, thin-film distillation or other chemical unit operations; a heating treatment is generally carried out at a certain degree of vacuum.

The copolymer polyol prepared with the modified polyether polyol of the present disclosure is particularly suitable for being used for preparing a polyurethane foam material (such as flexible polyurethane foam). Therefore, the present disclosure further provides a polyurethane foam material, which is obtained through foaming of a composition of the copolymer polyol prepared by the preparation method described above and a polyisocyanate.

In the present disclosure, the polyisocyanate used for preparing the polyurethane foam material may adopt a well-known isocyanate (for example, an isocyanate described in patent document US20034217A1) allowed to be used in the field of polyurethane production. From practical considerations, the polyisocyanate is preferably one or more of an aliphatic polyisocyanate, a cycloaliphatic polyisocyanate, and an aromatic polyisocyanate. For example, the aliphatic polyisocyanate includes, but is not limited to, 1,6-hexamethylene diisocyanate and the like; for example, the cycloaliphatic polyisocyanate includes, but is not limited to, one or a combination of two or more of 1,6-hexamethylene diisocyanate, 1-isocyanate-3,5,5-trimethyl-1,3-isocyanatomethylcyclohexane, 2,4- and 2,6-hexahydrotoluene-diisocyanate, 4,4'-, 2,2'- and 2,4'-bicyclohexyl-methane diisocyanate and isomeric mixtures thereof; for example, the aromatic polyisocyanate includes, but is not limited to, one or a combination of two or more of 2,4- and 2,6-toluene diisocyanate (TDI) and isomeric mixtures thereof, 4,4'-, 2,4'- and 2,2'-diphenylmethane diisocyanate (MDI) and isomeric mixtures thereof, or a mixture of 4,4'-, 2,4'- and 2,2'-diphenylmethane diisocyanate and a polyphenyl polymethylene polyisocyanate (PMDI); and one or a combination of two or more of modified polyisocyanates containing carbamate, carbodiimide, allophanate, urea, biuret, or isocyanurate group that derived from these polyisocyanates. In the present disclosure, the equivalence ratio ((NCO group/active hydrogen atom)×100) of NCO groups in the polyisocyanate to active hydrogen atoms in the polyol premix (which refers to other raw material components other than the polyisocyanate), also referred to as an NCO index, may be appropriately adjusted from the perspective of the mechanical properties of polyurethane, for example, preferably 80-140, more preferably 85-120, particularly preferably 95-115.

The specific preparation process of polyurethane foam may adopt a corresponding process known in the art. A polyurethane catalyst, a crosslinking agent, a foaming agent, a foam stabilizer, and the like are also commonly added to the reaction system. The polyurethane catalyst may adopt a corresponding catalyst commonly used in the art, and for example, includes, an organometallic compound such as one or a combination of two or more of stannous octoate, stannous oleate, dibutyltin dilaurate, dibutyltin acetate, and dibutyltin diacetate; and an organic amine catalyst such as one or a combination of two or more of bis(2,2'-dimethylamino)ethyl ether, trimethylamine, triethylamine, triethylenediamine, and dimethylethanolamine. The polyurethane catalyst is generally used in an amount of about 0.1% to 3.0% based on the weight of the polyol premix (which refers to other raw material components than the polyisocyanate). An appropriate foaming agent includes one or a combination of two or more of water, acetone, carbon dioxide, halogenated hydrocarbons, aliphatic alkanes, and cycloaliphatic alkanes. In the preparation of polyurethane foam, the crosslinking agent may adopt a crosslinking agent commonly used in the art and, for example, includes, but is not limited to, glycerol and/or diethanolamine. If a crosslinking agent is used, the crosslinking agent may be used in an amount of less than 3% (w/w), preferably 0.2% to 1.5% (w/w) based on the weight of the polyol premix. Examples of appropriate foaming agents include, but are not limited to, one or a combination of two or more of water, acetone, carbon dioxide, halogenated hydrocarbons, aliphatic alkanes, and cycloalkanes. As is well-known in the art, carbon dioxide may be generated through a reaction of water as the foaming agent with the isocyanate and used as the foaming agent. Aliphatic alkanes and cycloalkanes are developed as alternative foaming agents of CFC compounds. The foaming agents may be used alone, or as a mixture of two or more of the foaming agents. The foaming agent is used in an amount of, for example, 0.1% to 20% (w/w) based on the weight of the polyol premix. An appropriate foam stabilizer is, for example, an organopolysiloxane surfactant. The foam stabilizer may be used in an amount of 0.4% to 1% (w/w) based on the weight of the polyol premix. According to product requirements, auxiliaries such as flame retardants, fillers, light stabilizers, and antioxidants are also commonly added in an amount of 0.1% to 50% (w/w) based on the weight of the polyol premix, which will not be repeated here one by one.

The present disclosure further provides a product containing the polyurethane foam material described above.

The technical solutions provided by the present disclosure have the following beneficial effects:

1. Compared to end-capping with EO in conventional process, end-capping is performed using polymerizable double bonds in the present disclosure. Two polymerizable double bonds are introduced into the polyether polyol, achieving higher unsaturation and more active sites. The resulting modified polyether polyol may improve its affinity to the olefinic unsaturated monomer when used as a dispersion stabilizer. The modified polyether polyol has better steric resistance stabilizing and anchoring effects, better filterability, and low viscosity.

2. In a preferred embodiment of the preparation of the modified polyether polyol, a composite catalyst is used in the reaction of step (2) to implement GMA end-capping and meta-isomerization in one step. In addition, the composite catalyst of the present disclosure preferably adopts an oxidized tertiary amine compound and a halide, wherein the halide preferably adopts a calcium salt and/or a barium salt. The composite catalyst itself has a surface-active function. The calcium salt and/or the barium salt have(has) no catalytic effect on the reaction between a hydroxyl compound and the isocyanate. The composite catalyst does not need to be subjected to passivation and post-treatment and the reaction is directly used for the subsequent synthesis of the copolymer polyol, thereby improving the stability of the product.

3. When the modified polyether polyol of the present disclosure is applied to the synthesis process of the copolymer polyol, the modified polyether polyol has excellent stability in the synthesis process of the copolymer polyol, and the synthesized polymer has uniform particle size distribution and endows the polyurethane foam with excellent uniform foaming performance and reduces the internal stress of the polyurethane foam, allowing uniform openings and fine pores.

DETAILED DESCRIPTION

Figure 1:
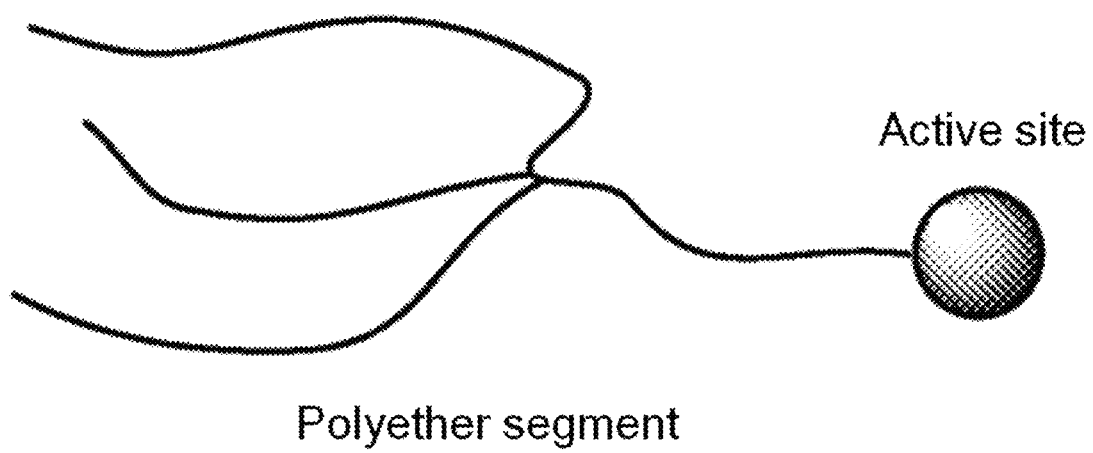
FIG. 1 is a structure diagram of an existing polyether polyol.
Figure 2:
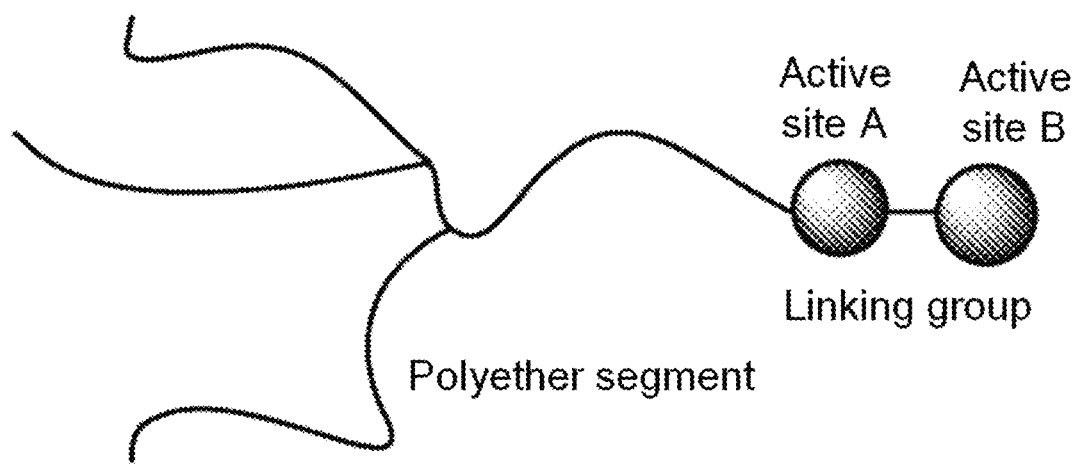
FIG. 2 is a structure diagram of a modified polyether polyol in some embodiments of the present disclosure.

For a better understanding of technical solutions of the present disclosure, the content of the present disclosure is further described below in conjunction with examples and is not limited to the examples set forth below.

Some raw materials involved in examples and comparative example are described below.

Polyether polyol A: A reaction was carried out using sorbitol as a starter and using KOH as a catalyst in an amount of 0.3% of the mass of propylene oxide (PO) at a reaction temperature of 110±5° C. under a pressure of lower than 0.15 MPa. After PO was fed, the reaction system was aged for 2 h and degassed for 1 h. After degassing, ethylene oxide (EO) was fed, and a reaction was carried out at a reaction temperature of 110±5° C. under a pressure of lower than 0.15 MPa. After materials were fed, the reaction system was aged for 2 h and degassed for 1 h. At this time, the reaction stage ended. With the temperature controlled at 85-90° C., the reaction product was neutralized by soft water and phosphoric acid added thereto, dehydrated, filtered and cooled to 25° C. for output. The mass ratio of sorbitol, EO, and PO was 1.08:4.95:93.97. The polyether polyol A was obtained. After measurement, the polyether polyol had a hydroxyl value of about 28 mgKOH/g, an average molecular weight of 11400 g/mol, and an average functionality of 5.7.

Base polyol B: a polyether polyol for high-resilience and flexible foam, prepared by reacting glycerol with propylene oxide and ethylene oxide, available from Wanhua Chemical Group Co., Ltd., WANOL®F3135.

Base polyether polyol: a polyether polyol for ordinary flexible foam, prepared by reacting glycerol with propylene oxide and ethylene oxide, available from Wanhua Chemical Group Co., Ltd., WANOL®F3136.

OA-12: an oxidized dimethyl dodecyl tertiary amine, which is dehydrated and dried to obtain a viscous liquid.

WANNATE®8001: modified diphenylmethane diisocyanate (MDI) from Wanhua Chemical Group Co., Ltd.

BiCAT®8106: an organic bismuth catalyst from Shepherd Chemical Company.

B-8715 LF2: a foam stabilizer from TMG Chemicals Co., Ltd.

Other raw materials involved in examples set forth below were purchased from Aladdin Biochemical Technology Co., Ltd unless otherwise specified.

Detection methods involved in examples and comparative examples are described below.

Hydroxyl value: GB 12008.3-2009 Plastics—Polyether Polyols—Part 3: Determination of hydroxyl value Viscosity: GB 12008.7-2010 Plastics—Polyether Polyols—Part 7: Determination of viscosity Unsaturation: GB 12008.6-2010 Plastics—Polyether polyols—Part 6: Determination of unsaturation Solid content: GB/T 31062-2014 Polymeric polyols Example 1

Preparation of Dispersion Stabilizer 1

3000 g of polyether polyol A, 24.2 g of maleic anhydride, and 3 g of KOH were mixed uniformly, heated to 120° C., and reacted for 5 h.

Then, 5.0 g of OA-12 and 3.1 g of calcium bromide were added, stirred uniformly, then 22.8 g of glycidyl acrylate and 1.78 g of hydroquinone were added, and reacted at 100° C. for 5 h to obtain a transparent brown-yellow liquid with a viscosity of 2520 mPa·s and a measured unsaturation of 0.095 meq/g.

Example 2

Preparation of Dispersion Stabilizer 2

3000 g of polyether polyol A, 22.5 g of itaconic anhydride, and 3 g of KOH were mixed uniformly, heated to 130° C., and reacted for 3 h.

Then, 6 g of OA-12 and 2.6 g of barium bromide were added, stirred uniformly, then 37.3 g of glycidyl methacrylate and 1.78 g of p-hydroxyanisole were added, and reacted at 130° C. for 4 h to obtain a transparent light-yellow liquid with a viscosity of 2850 mPa·s and a measured unsaturation of 0.103 meq/g.

Example 3

Preparation of Copolymer Polyol 1

A 500 mL four-necked bottle equipped with a stirrer, a heating device, a temperature control device, and a feeder was used as a reactor. 55.4 g of base polyol B and 5.6 g of dispersion stabilizer 1 were added to the reactor. After purged with nitrogen, the reaction system was stirred and slowly heated to 110° C., top materials (a mixed solution of 10.47 g of isopropanol, 85.71 g of base polyether polyol WANOL®F3156, 46.55 g of acrylonitrile, 69.83 g of styrene, and 1.21 g of azobisisobutyronitrile) were continuously added, and the temperature was controlled at 115° C. to 120° C. The above mixed solution was added dropwise within 100 min. After the materials were fed completely, the reaction system was aged for 1 h and heated to 160° C. The unreacted monomers were removed under vacuum for 2 h to obtain a product. The indexes of the product were measured. The solid content was 44.6% and the viscosity was 4950 cp (25° C.).

Example 4

Preparation of Copolymer Polyol 2

A 500 mL four-necked bottle equipped with a stirrer, a heating device, a temperature control device, and a feeder was used as a reactor. 55.4 g of base polyol B and 5.6 g of dispersion stabilizer 2 were added to the reactor. After purged with nitrogen, the reaction system was stirred and slowly heated to 110° C., top materials (a mixed solution of 10.47 g of isopropanol, 85.71 g of base polyether polyol WANOL®F3156, 46.55 g of acrylonitrile, 69.83 g of styrene, and 1.21 g of azobisisobutyronitrile) were continuously added, and the temperature was controlled at 115° C. to 120° C. The above mixed solution was added dropwise within 100 min. After the materials were fed completely, the reaction system was aged for 1 h and heated to 160° C. The unreacted monomers were removed under vacuum for 2 h to obtain a product with a solid content of 44.5% and a viscosity of 5018 cp (25° C.).

Comparative Example

Preparation of dispersion stabilizer 3: 3000 g of polyether polyol A and 30.6 g of maleic anhydride were heated to 120° C. and reacted for 12 h under nitrogen protection. Then, 50 g of ethylene oxide (EO) were added and the reaction was continued for 4 h at 130° C. Unreacted EO was removed to obtain a product as a transparent brown-yellow liquid with a viscosity of 5500 mPa·s and a measured unsaturation of 0.045 meq/g. The modified polyether polyols prepared in Examples 1 and 2 had higher unsaturation and more active sites than this comparative example.

A 500 mL four-necked bottle equipped with a stirrer, a heating device, a temperature control device, and a feeder was used as a reactor. 55.4 g of base polyol B and 5.6 g of comparative dispersion stabilizer 3 were added to the reactor. After purged with nitrogen, the reaction system was stirred and slowly heated to 110° C., top materials (a mixed solution of 10.47 g of isopropanol, 85.71 g of base polyether polyol WANOL®F3156, 46.55 g of acrylonitrile, 69.83 g of styrene, and 1.21 g of azobisisobutyronitrile) were continuously added, and the temperature was controlled at 115° C. to 120° C. The above mixed solution was added dropwise within 100 min. After the materials were fed completely, the reaction system was aged for 1 h. Subsequently, the unreacted monomers were removed under vacuum for 2 h to obtain a product with a solid content of 45.0% and a viscosity of 5783 cp (25° C.).

Example 6

Method for Preparing Polyurethane Foam:

Premixes were prepared according to raw materials and their parts by weight in Table 1. The premixes and an isocyanate were placed at a constant temperature of 22° C. for 3 h, separately. Then, 100 g of each premix and 60 g of isocyanate WANNATE®8001 were stirred to be mixed in a stirrer (with rotational speed of 3000 rpm) for 6 s. The stirred mixture was quickly poured into an aluminum open mold (size: 300 mm length, 300 mm width, and 50 mm thickness) previously heated to 60° C. so that the mixture was allowed to foam. After 7 min, the foam was taken out to obtain the polyurethane foam.

TABLE 1

Formulation of premixes

| Material | Polyurethane Foam No. | | |
| --- | --- | --- | --- |
| | 1# | 2# | 3# |
| Copolymer polyol | 33.70 | 33.70 | 33.70 |
| WANOL ® F3156 (base polyether polyol) | 59.46 | 59.46 | 59.46 |
| Diethanolamine | 0.50 | 0.50 | 0.50 |
| Water | 4.16 | 4.16 | 4.16 |
| N,N-bis(dimethylaminopropyl) isopropanolamine | 0.40 | 0.40 | 0.40 |
| N,N,N'-trimethyl-N'-hydroxyethyl diaminoethyl ether | 0.50 | 0.50 | 0.50 |
| BiCAT ® 08106 (an organic bismuth catalyst) | 0.10 | 0.10 | 0.10 |
| B-8715 LF2 (a foam stabilizer) | 1.19 | 1.19 | 1.19 |

In Table 1, polyurethane foams 1#, 2#, and 3# were prepared using the copolymer polyols prepared in Comparative Example, Example 3, and Example 4, respectively.

The tested performance indexes of the prepared polyurethane foams and the corresponding test criteria are shown in Table 2.

TABLE 2

Performance of polyurethane foams

| Item | Test Criteria | Polyurethane Foam No. | | |
| --- | --- | --- | --- | --- |
| | | 1# | 2# | 3# |
| VOC 90° C./0.5 h | VDA 278 | 50 | 45 | 35 |
| Odor (μgC/g) 80° C./2 h | VDA 270B3 | 5 | 3 | 4 |
| Tensile strength (Kpa) | ISO1798 | 95 | 110 | 115 |
| Elongation at break (Kpa) | ISO1798 | 80 | 85 | 90 |

Figure 3:
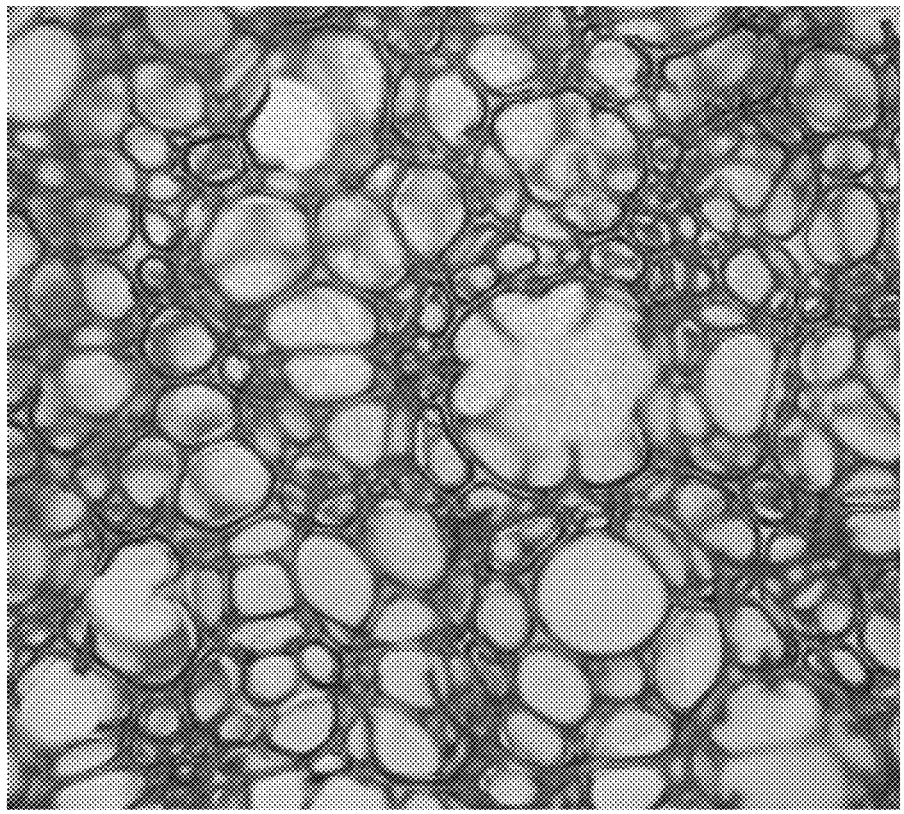
FIGS. 3 to 5 show results of observation of foam microstructures of polyurethane foams 1# to 3#, respectively.
Figure 4:
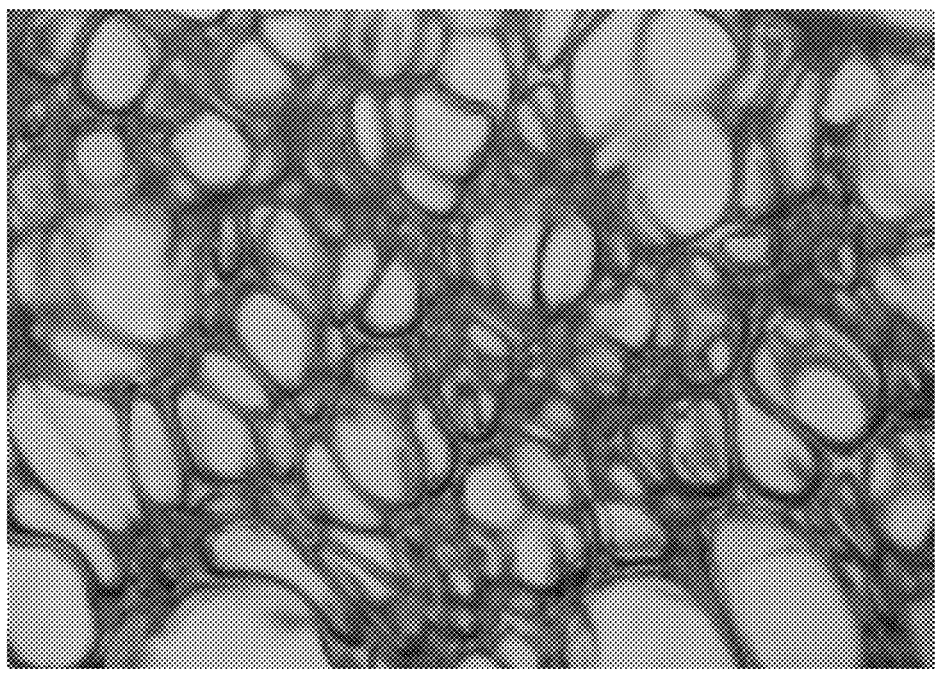
Figure 5:
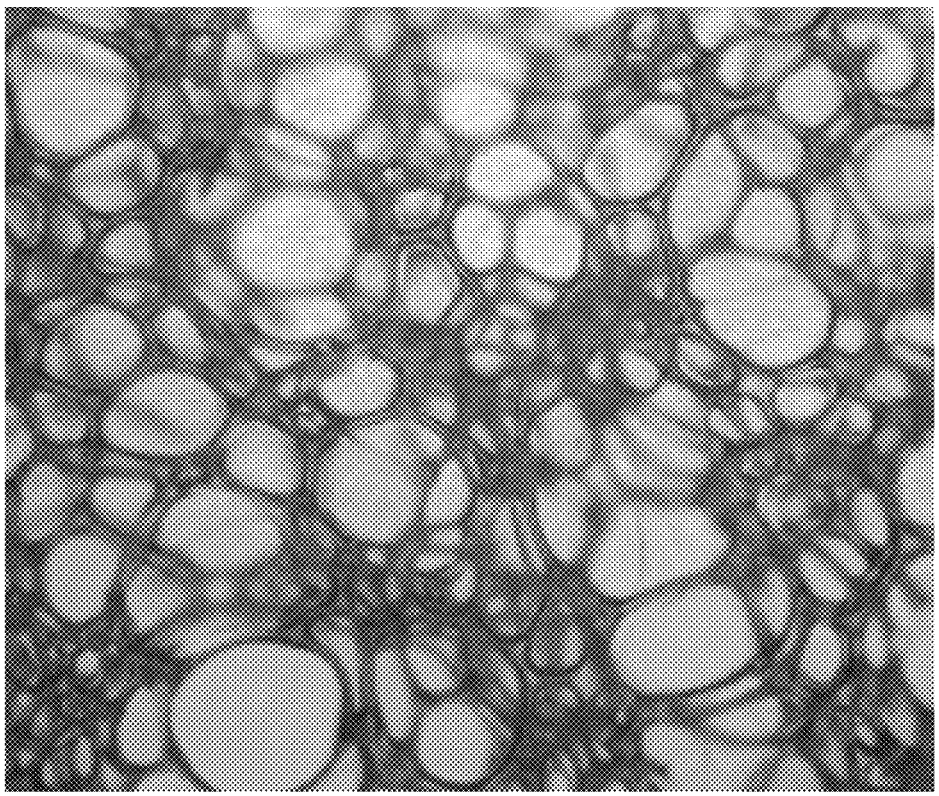

The foam microstructures of polyurethane foams 1#, 2#, and 3# were observed using an Olympus IX73 microscope. The results are shown in FIGS. 3 to 5, respectively. Foam 1# had many large and coarse pores, with pores being messy; foams 2# and 3# had few coarse pores, with pores being fine. From test results, the copolymer polyols prepared with the modified polyether polyols of the present disclosure in the embodiments of the present disclosure had lower viscosity and good filterability; and the polyurethane foam prepared with the obtained copolymer polyols had better comprehensive performance.

Those skilled in the art will appreciate that some modifications or adaptations may be made to the present disclosure based on the teachings of the description. These modifications or adaptations should fall within the scope of the present disclosure as defined by the claims.

What is claimed is:

1. A method for preparing a modified polyether polyol, comprising the following steps:
    (1) contacting and reacting a compound A with a polyether polyol; wherein the compound A is an anhydride and/or a dicarboxylic acid compound containing a polymerizable double bond; and
    (2) reacting the product obtained in step (1) with an epoxy compound containing a polymerizable double bond in the presence of a catalyst, to produce the modified polyether polyol;

wherein the catalyst used in step (2) comprises a catalyst A and a catalyst B, wherein the catalyst A is an oxidized tertiary amine compound; and
the catalyst B is a halide.

2. The method according to claim 1, wherein a molar ratio of the compound A to the polyether polyol is 0.5-1.5:1; and a molar ratio of the compound A to the epoxy compound is 0.2-4:1.

3. The method according to claim 1, wherein in step (1), the compound A is reacted with the polyether polyol in the presence of a catalyst.

4. The method according to claim 1, wherein the epoxy compound containing a polymerizable double bond is 1,2-epoxide containing an olefinic double bond.

5. The method according to claim 1, wherein the polyether polyol used in step (1) has an average molecular weight of 2500-15000.

6. A modified polyether polyol, which is prepared by the method according to claim 1.

7. A polyurethane foam material, which is obtained through foaming of a composition of a copolymer polyol and polyisocyanate,
wherein the copolymer polyol is prepared by a method comprising: polymerizing a base polyether polyol with at least one olefinic unsaturated monomer in the presence of an initiator and a dispersion stabilizer to obtain the copolymer polyol; wherein the dispersion stabilizer is the modified polyether polyol according to claim 6.

8. The method according to claim 1, comprising the following steps:
(1) contacting and reacting a compound A with a polyether polyol at a reaction temperature of 80-160° C.; wherein the compound A is one or two selected from maleic anhydride and itaconic anhydride; and
(2) reacting the product obtained in step (1) with an epoxy compound containing a polymerizable double bond in the presence of a catalyst at a reaction temperature of 60-150° C. to produce the modified polyether polyol.

9. The method according to claim 8, comprising the following steps:
(1) contacting and reacting a compound A with a polyether polyol at a reaction temperature of 120-140° C.; wherein the compound A is maleic anhydride; and
(2) reacting the product obtained in step (1) with an epoxy compound containing a polymerizable double bond in the presence of a catalyst at a reaction temperature of 80-130° C., to produce the modified polyether polyol.

10. The method according to claim 9, wherein a molar ratio of the compound A to the polyether polyol is 0.9-1:1; and a molar ratio of the compound A to the epoxy compound is 0.5-1.5:1.

11. The method according to claim 3, wherein in step (1), the compound A is reacted with the polyether polyol in the presence of a catalyst, wherein the catalyst is used in an amount of 0.1% to 3% of the mass of the polyether polyol.

12. The method according to claim 11, whereon the catalyst used in step (1) is one or a combination of two or more of carbonates, bicarbonates, and hydroxides of alkali metals or alkaline earth metals.

13. The method according to claim 1, wherein the oxidized tertiary amine compound is selected from the group consisting of oxidized aryl tertiary amines, oxidized alkyl tertiary amines, oxidized cycloalkyl tertiary amines, oxidized acyl tertiary amines, and oxidized hydroxyl-substituted tertiary amines.

14. The method according to claim 1, wherein the oxidized tertiary amine compound comprises an oxidized alkyl methyl tertiary amine containing 8-22 carbon atoms.

15. The method according to claim 1, wherein the halide is selected from the group consisting of an organic bromide, a bromide salt, an iodide salt and an organic iodide.

16. The method according to claim 1, wherein a mass ratio of the catalyst A to the catalyst B is 0.5-4:1.

* * * * *